US008380995B1

(12) United States Patent  
Paul (10) Patent No.: US 8,380,995 B1  
(45) Date of Patent: Feb. 19, 2013

(54) PROCESS FOR LOGIN OF A COMPUTING DEVICE WITH A TOUCHSCREEN

(75) Inventor: Sean Paul, Elora (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/306,792

(22) Filed: Nov. 29, 2011

(51) Int. Cl.
G06F 3/041 (2006.01)
G06F 3/045 (2006.01)
G06F 21/00 (2006.01)

(52) U.S. Cl. ............... 713/186; 726/5; 726/19; 726/20; 345/173; 345/174; 382/115; 382/121; 382/125; 382/126; 382/192

(58) Field of Classification Search .................. 713/186
See application file for complete search history.

(56) References Cited

U.S. PATENT DOCUMENTS

| 5,073,950 | A * | 12/1991 | Colbert et al. ................ 382/115 |
| 5,821,871 | A * | 10/1998 | Benzler .......................... 340/5.8 |
| 6,185,316 | B1 * | 2/2001 | Buffam .......................... 382/115 |
| 6,681,034 | B1 * | 1/2004 | Russo ........................... 382/125 |
| 6,766,040 | B1 * | 7/2004 | Catalano et al. ............... 382/115 |
| 6,898,299 | B1 * | 5/2005 | Brooks .......................... 382/115 |
| 7,274,807 | B2 * | 9/2007 | Hillhouse et al. ............. 382/124 |
| 7,599,523 | B2 * | 10/2009 | Miura et al. .................. 382/115 |
| 7,800,592 | B2 | 9/2010 | Kerr et al. |
| 8,051,468 | B2 * | 11/2011 | Davis et al. ....................... 726/5 |
| 2004/0017934 | A1 * | 1/2004 | Kocher .......................... 382/125 |
| 2004/0052405 | A1 * | 3/2004 | Walfridsson ................... 382/115 |
| 2004/0125993 | A1 * | 7/2004 | Zhao et al. ..................... 382/124 |
| 2005/0069177 | A1 * | 3/2005 | Bezvershenko et al. ....... 382/115 |
| 2005/0084143 | A1 * | 4/2005 | Kramer et al. ................. 382/125 |
| 2005/0180620 | A1 * | 8/2005 | Takiguchi ...................... 382/128 |
| 2006/0034492 | A1 | 2/2006 | Siegel et al. |
| 2006/0268109 | A1 * | 11/2006 | Miyoshi et al. ................ 348/143 |
| 2008/0069412 | A1 * | 3/2008 | Champagne et al. .......... 382/124 |
| 2008/0092245 | A1 * | 4/2008 | Alward et al. ................... 726/28 |
| 2009/0044023 | A1 * | 2/2009 | Crumlin et al. ................ 713/186 |
| 2010/0119126 | A1 * | 5/2010 | Rane et al. ..................... 382/125 |

OTHER PUBLICATIONS

U.S. Environmental Protection Agency, 'Process for Conducting Probabilistic Risk Assessment, RAGS vol. 3 Part A, Appendix B ' EPA 540-R-02-002, OSWER 9285.7-45, PB2002 963302, Dec. 2001, entire appendix, http://www.epa.gov/oswer/riskassessment/rags3adt/pdf/appendixb.pdf.*

Zunkel, R., 'Hand Geometry Based Verification', Recognition Systems Inc, 1998, entire document, http://www.cse.msu.edu/~cse891/Sect601/textbook/4.pdf.*

* cited by examiner

Primary Examiner — Edan Orgad  
Assistant Examiner — Ronald Baum  
(74) Attorney, Agent, or Firm — McAndrews, Held & Malloy, Ltd.

(57) ABSTRACT

A method, a system, and a computer-readable medium are provided for identifying a user on a computing device using biometric hand data. An indication is received that a hand of a user has been placed on a touchscreen of a computing device. The locations of a plurality of user contact points made between the hand of the user and the touchscreen that define a user hand framework are determined. The user hand framework is matched with a corresponding stored hand framework, defined by a plurality of stored contact points, from a data repository. Finally, the user is identified based on the corresponding hand framework.

22 Claims, 8 Drawing Sheets

PROCESS FOR LOGIN OF A COMPUTING DEVICE WITH A TOUCHSCREEN

BACKGROUND

1. Field

This field is generally related to using biometric data to login to a computing device with a touchscreen.

2. Background

Typical login processes for computing devices with touchscreens involve using a keyboard presented on the screen to type a password. Typing on a screen is slow and error-prone. Thus, such typing presents a significant barrier to entry for someone trying to quickly login to such a computing device.

Other systems present the user with a pattern that can be drawn on the screen. While this is quicker than the software keyboard, it leaves smudge marks on the screen which might allow for intruders to guess the pattern. Furthermore, the user typically needs to set up the pattern on his or her device before using it.

Thus, present approaches have not yet developed a way for users to identify themselves on a touchscreen that is convenient, accurate, and secure.

BRIEF SUMMARY

A computer-implemented method, system, and computer-readable medium are provided for identifying a user on a computing device using biometric hand data. In an embodiment, an indication is received that a hand of the user has been placed on a touchscreen of the computing device. The locations of a plurality of user contact points made between the hand of the user and the touchscreen are determined, wherein the plurality of user contact points define a user hand framework. The user hand framework is matched with a corresponding stored hand framework, defined by a plurality of stored contact points, from a data repository. The matching may include several stages. In an embodiment, the user hand framework is compared to stored hand frameworks in the data repository by calculating distances between the plurality of user contact points in the user hand framework and respective stored contact points in the stored hand frameworks from the data repository. It is determined which of the user contact points in the user hand framework are within a predetermined tolerance radius of the respective stored contact points of stored hand frameworks in the data repository. A stored hand framework from the data repository is identified that minimizes an average of the distances between user contact points from the user hand framework within the tolerance radius and the respective stored contact points of the identified stored hand framework from the data repository, wherein at least a preset minimum proportion of user contact points from the user hand framework are within the tolerance radius of the respective stored contact points from the identified stored hand framework. It is determined that the identified stored hand framework, is the corresponding hand framework when the average of the distances between user contact points and respective stored contact points is less than a preset maximum. The user is identified based on the corresponding hand framework.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate embodiments of the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments use points of contact to determine the identity of the user logging in. Current touchscreens support reading 10 or more points of contact. Embodiments are based on the principle that the points of contact for each hand of a person will differ in spacing and shape. By placing a hand on the touchscreen, users can be granted access to the computing device with minimal effort. Furthermore, the pattern of contact points will be difficult to replicate, so this approach will be more secure than the pattern drawing approach.

It is worth noting that the position and orientation of the hand on the touchscreen does not need to be the same every time. As long as the space between contact points and the shape of the contact points are the same, identification is possible. Phrased another way, the hand of the user defines a hand framework, and hand frameworks are considered to be equivalent if they only differ in being translated and/or rotated with respect to the touchscreen. The process by which hand frameworks are matched with equivalent hand frameworks is discussed below.

Figure 1:
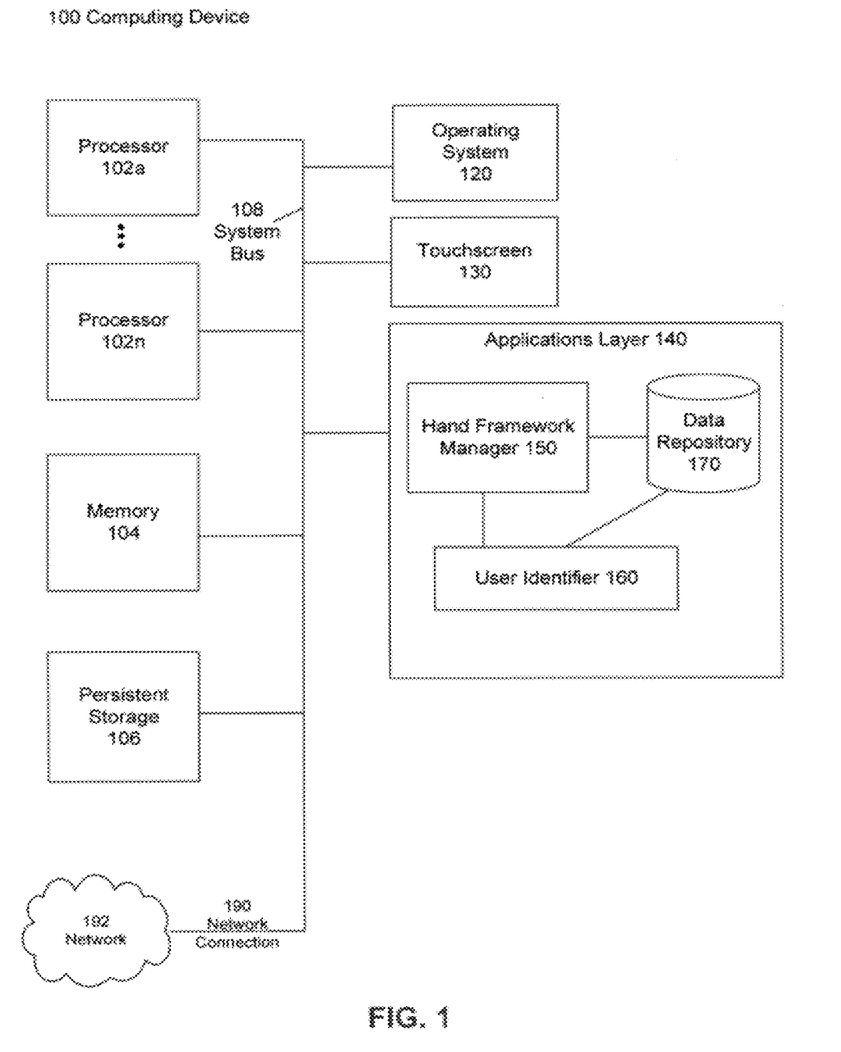
FIG. 1 is a diagram illustrating an exemplary system for identifying a user.

Each of the constituent parts of a system embodiment may be implemented on any computing device 100, with the caveat that computing device 100 must be coupled to and receive input from at least one touchscreen 130 or another input source that can identify contact points. Such computing device 100 can include, but is not limited to, a personal computer, mobile device such as a mobile phone, tablet, workstation, embedded system, game console, television, set-top box, or any other computing device 100. Further, computing device 100 can include, but is not limited to, a device having a processor and memory for executing and storing instructions. Software may include one or more applications and an operating system. Hardware can include, but is not limited to, a processor, memory and graphical user interface display. The graphical user interface display may have an integrated touchscreen 130, or the touchscreen 130 may receive input without also serving as a display, e.g. the touchscreen 130 may refer to a tablet or trackpad. Computing device 100 may also have multiple processors and multiple shared or separate memory components. For example, computing device 100 may be a clustered computing environment or server farm.

Each of the constituent parts of a system embodiment may be implemented in hardware, software, firmware, or any combination thereof, except for the touchscreen, which must be a hardware touchscreen 130. Likewise, modules or instructions that constitute operative parts of embodiments may utilize any type of structured memory, including a persistent memory. In examples, each data storage infrastructure may be implemented as a relational database.

It should be noted that computer-readable medium embodiments may include any physical medium which is capable of encoding instructions that may subsequently be used by a processor to implement methods described herein. Example physical media may include floppy discs, optical discs (e.g. CDs, mini-CDs, DVDs, HD-DVD, Blu-ray), hard drives, punch cards, tape drives, flash memory, and memory chips. However, any other type of tangible, persistent storage that can serve in the role of providing instructions to a processor may be used to store the instructions in these embodiments.

FIG. 1 is a diagram illustrating an exemplary system for identifying a user. Computing device 100 identifies a user using biometric hand data.

The diagram of FIG. 1 illustrates computing device 100 that contains a combination of hardware, software, and firmware constituent parts that allow it to run an application layer 140 with access to additional resources over a network 192 via a network connection 190. Computing device 100 may be a conventional computer such as a desktop or laptop PC, but it may additionally be any Web-enabled peripheral such as a game console, a tablet, a netbook or a smartphone. Computing device 100 as shown in FIG. 1 may be organized around a system bus 108, but any type of infrastructure that allows the hardware infrastructure elements of computer system 100 to communicate with and interact with each other may be used to function as this part of computer system 100.

The processing task in the embodiment of FIG. 1 is carried out by one or more processors 102a . . . 102n, but it should be noted that any type of processing technology may be used here, including multi-core processors, multiple processors, or distributed processors. Additional specialized processing resources such as graphics, multimedia, or mathematical processing capabilities, either in hardware or in software, may also be used as adjuncts or replacements for processors 102a . . . 102n for certain processing tasks.

In order to manipulate data, processors 102a . . . 102n access a memory 104 via system bus 108. For data which needs to be stored more permanently, processors 102a . . . 102n access persistent storage 106. Processors 102a . . . 102n, memory 104 and persistent storage 106 operate in coordination with operating system 120 to provide basic functionality for computing device 100. Operating system 120 provides support functionality for applications layer 140.

Applications layer 140 includes several functional subsystems, which are depicted as being local to computing device 100 but may additionally be remote to computing device 100 and be accessed via network connection 190 over network 192. The functional subsystems include a hand framework manager 150, a user identifier 160, and a data repository 170. While the cooperation of these functional subsystems is discussed in greater depth below, the hand framework manager 150 receives input of a user hand framework from touchscreen 130, which it then uses to find a corresponding hand framework by searching data repository 170, and then identifies the user by using the user identifier subsystem 160 based on the corresponding hand framework.

Computing device 100 may use network connection 190 to communicate with other processing machines via network 192. Network connection 190 may be a wired connection such as Ethernet, token ring, or optical, DSL, cable, or phone connections in conjunction with an appropriate modem. Similarly, appropriate wireless technology may be used to act as network connection 190 to access network 192. Network 192 may be the Internet, a local area network, or any other network 192 of machines with which computing device 100 may exchange data.

Each of the information storage parts of the computing device 100 may be stored in any type of structured memory, including a persistent memory. In examples, such a persistent memory may be implemented as a database, including a relational database.

Overview of the Method

Figure 2:
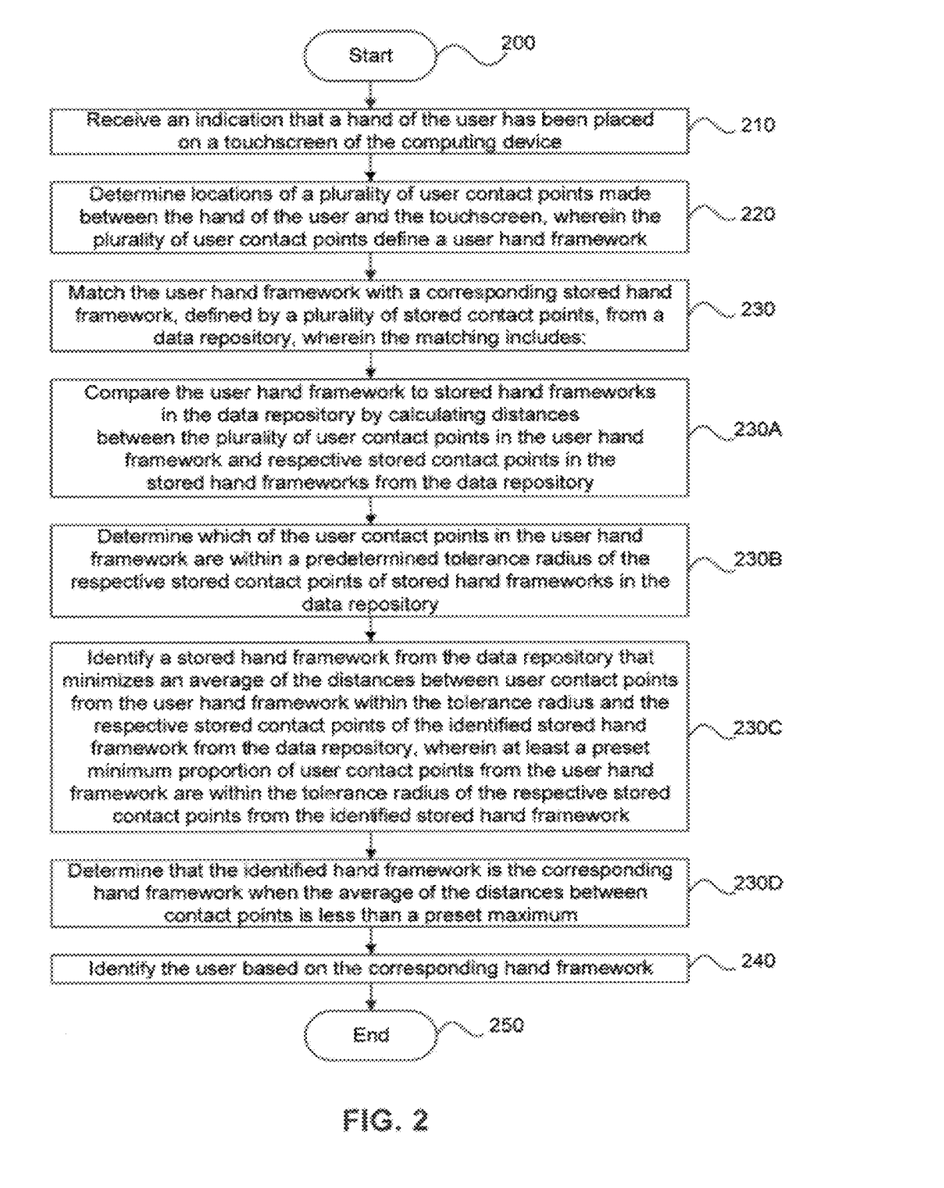
FIG. 2 is a flowchart of a method for identifying a user.

FIG. 2 is a flowchart of a method for identifying a user. FIG. 2 begins at stage 200, Start.

In stage 210, an indication is received that a hand of a user has been placed on a touchscreen of a computing device. In an exemplary embodiment, stage 210 occurs at touchscreen 130.

In stage 220, the locations of a plurality of user contact points made between the hand of the user and the touchscreen that define a user hand framework are determined. In an exemplary embodiment, stage 220 occurs at touchscreen 130.

In stage 230, the user hand framework is matched with a corresponding stored hand framework, defined by a plurality of stored contact points, from a data repository. In an exemplary embodiment, stage 230 occurs at hand framework manager 150. The matching includes stages 230A-230D.

In stage 230A, the user hand framework is compared to stored hand frameworks in the data repository by calculating distances between the plurality of user contact points in the user hand framework and respective stored contact points in the stored hand frameworks from the data repository. In an exemplary embodiment, stage 230A occurs at hand framework manager 150 and data repository 170.

In stage 230B, it is determined which of the user contact points in the user hand framework are within a predetermined tolerance radius of the respective stored contact points of stored hand frameworks in the data repository. In an exemplary embodiment, stage 230B occurs at hand framework manager 150 and data repository 170.

In stage 230C, the hand framework from the data repository is identified that minimizes an average of the distances between user contact points from the user hand framework within the tolerance radius and the respective stored contact points of the identified stored hand framework from the data repository, wherein at least a preset minimum proportion of user contact points from the user hand framework are within the tolerance radius of the respective stored contact points from the identified stored hand framework. In an exemplary embodiment, stage 230C occurs at hand framework manager 150 and data repository 170.

In stage 230D, it is determined that the identified hand framework is the corresponding hand framework when the average of the distances between user contact points and respective stored contact points is less than a preset maximum. In an exemplary embodiment, stage 230C occurs at hand framework manager 150 and data repository 170.

In stage 240, the user is identified based on the corresponding hand framework. In an exemplary embodiment, stage 240 occurs at hand framework manager 150 and user identifier 160.

FIG. 2 ends at stage 250, End.

Examples of Use

Figure 3:
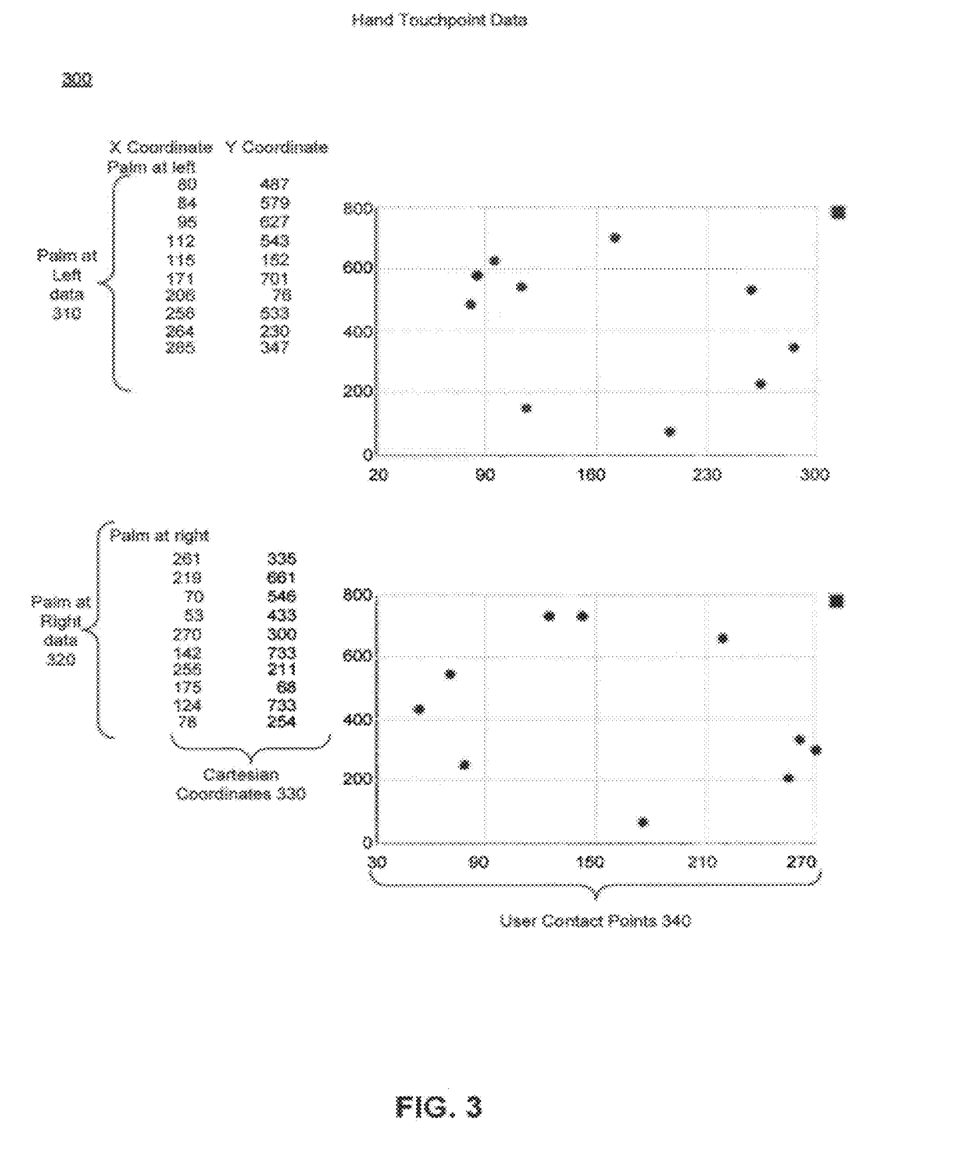
FIG. 3 is a diagram of two exemplary sets of user contact points.

FIG. 3 is a diagram of two exemplary sets of user contact points. The data is divided into two groups, palm at left data 310 and palm at right data 320. It is to be noted that the hand of the user may be placed palm-up, palm-down, or both one at a time, and the matching may incorporate using the palm-up, palm-down, or both types of data to facilitate finding the most relevant corresponding hand framework. Similarly, various embodiments may designate use of data from the right hand or left hand of users, though generally one hand or the other is preselected in order to provide for maximum consistency, as the left and right hands of a user may not match.

Figure 4:
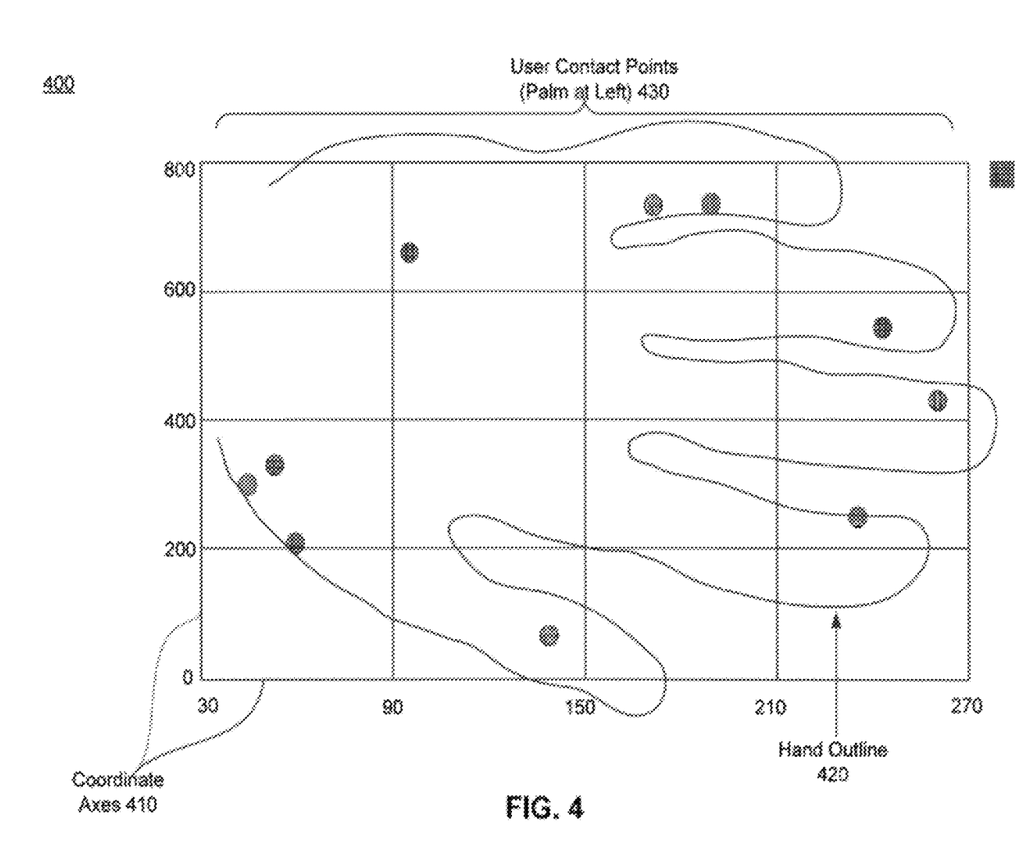
FIG. 4 is another exemplary diagram of user contact points, with the palm on the left.
Figure 5:
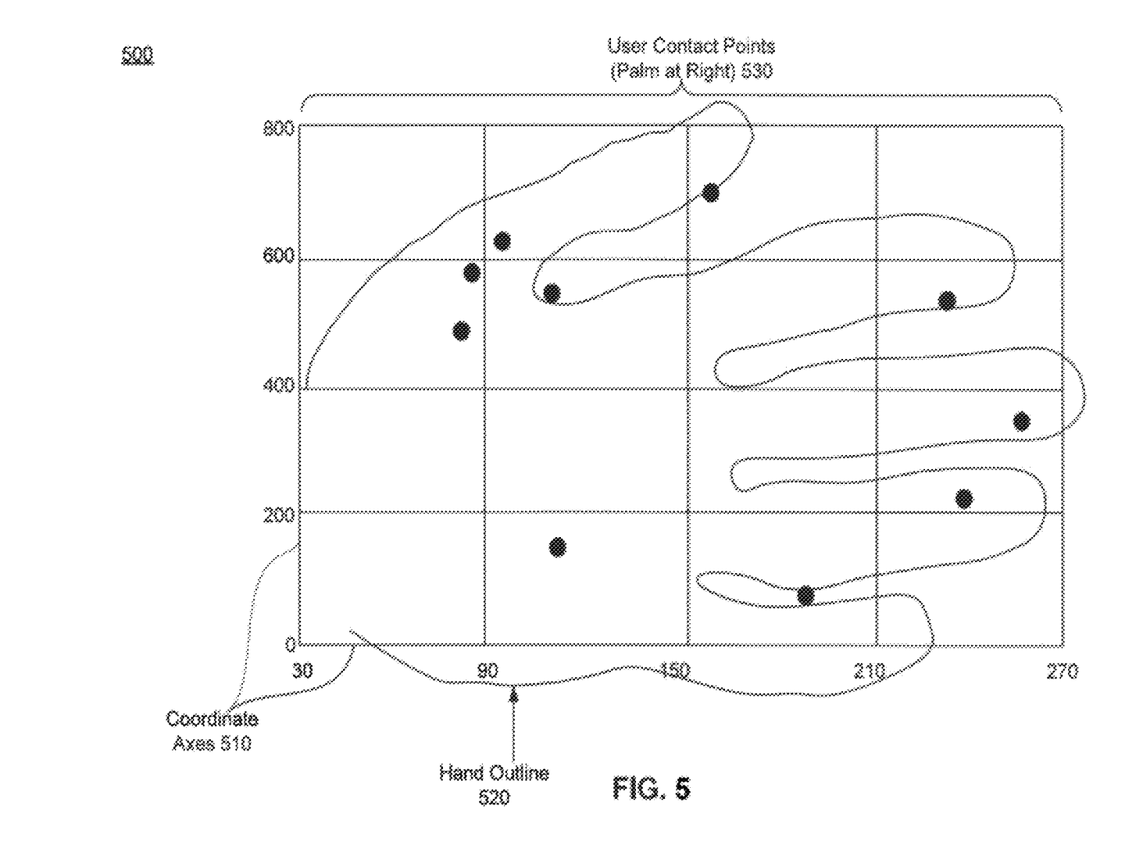
FIG. 5 is another exemplary diagram of user contact points, with the palm on the right.
Figure 6:
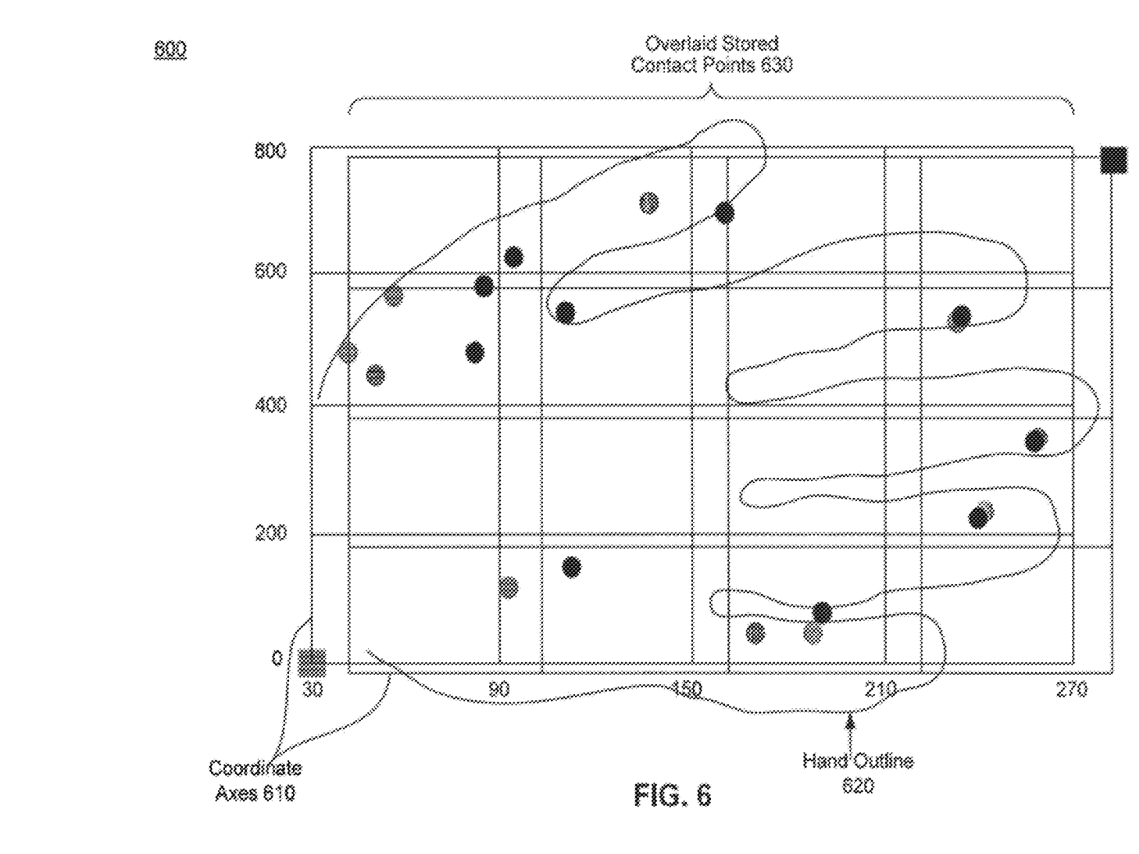
FIG. 6 is an exemplary diagram of overlaid stored contact points.

To clarify the meaning of palm at left and palm at right, these phrases refer to the position of the palm of the provided hand with respect to the thumb of the provided hand. Thus, palm at left data 310 may be provided by a left hand provided palm-down or a right hand provided palm-up. Similarly, palm at right data 320 may be provided by a right hand provided palm-down or a left hand provided palm up. FIGS. 4-6 illustrate how user contact point data is obtained and processed.

Thus, FIG. 3 provides for palm at left data 310 and palm at right data 320. The data consists of sets of Cartesian coordinates 330. Cartesian coordinates 330 may either be absolute Cartesian coordinates, defined with relationship to the boundaries of the touch screen computing device 100, or relative Cartesian coordinates, defined with relationship to an origin placed in the centroid of the hand framework, determined by appropriate mathematical techniques. Cartesian coordinates 330 define respective sets of user contact points 340, which are displayed on coordinate graphs. In an embodiment, user contact points 340 represent the primary locations at which the user's hand contacts the touchscreen. In another embodiment, these user contact points are representative of where areas on the hand of a user place the greatest pressure on touchscreen 130.

FIG. 4 is another exemplary diagram of user contact points, with the palm on the left. FIG. 4 shows a hand outline 420 which reflects a right hand with palm-up, or a left hand with palm down, because the thumb of the user is to the right of the palm. FIG. 4 defines a set of coordinate axes 410, and hand outline 420 is an example of how the hand of the user may be placed on touchscreen 130. The hand is placed palm at left as discussed above, and defines a plurality of user contact points 430 (user contact points 430 from the palm at left are small gray circles).

FIG. 5 is another exemplary diagram of user contact points, with the palm on the right. FIG. 5 shows a hand outline 520 which reflects a left hand with palm-up, or a right hand with palm down, because the thumb of the user is to the right of the palm. FIG. 5 defines a set of coordinate axes 510, and hand outline 520 is an example of how the hand of the user may be placed on touchscreen 130. The hand is placed palm at right as discussed above, and defines a plurality of user contact points 530 (user contact points 530 from the palm at right are small black circles).

FIG. 6 is an exemplary diagram of overlaid stored contact points. FIG. 6 defines a set of coordinate axes 610, and hand outline 620 shows the position of the hand of the user on touchscreen 130 with the palm at the right. In FIG. 6, user contact points 430 and 530 from FIG. 4 and FIG. 5 have been stored, and overlaid on each other such that they are displayed on the same set of coordinate axes. A variety of approaches may be taken to display the stored contact points on the same coordinate axes. In general, hand outlines 420 and 520 will be arranged so that 420 is reflected and translated so that it overlaps 520 to the maximum extent possible, and user contact points 430 are overlaid onto user contact points 530 appropriately. The overlaying improves the results by allowing palm-up and palm-down data from a designated hand to be combined. This combined data is stored as overlaid stored contact points 630, and can then be compared to contact points from an unidentified hand.

Figure 7:
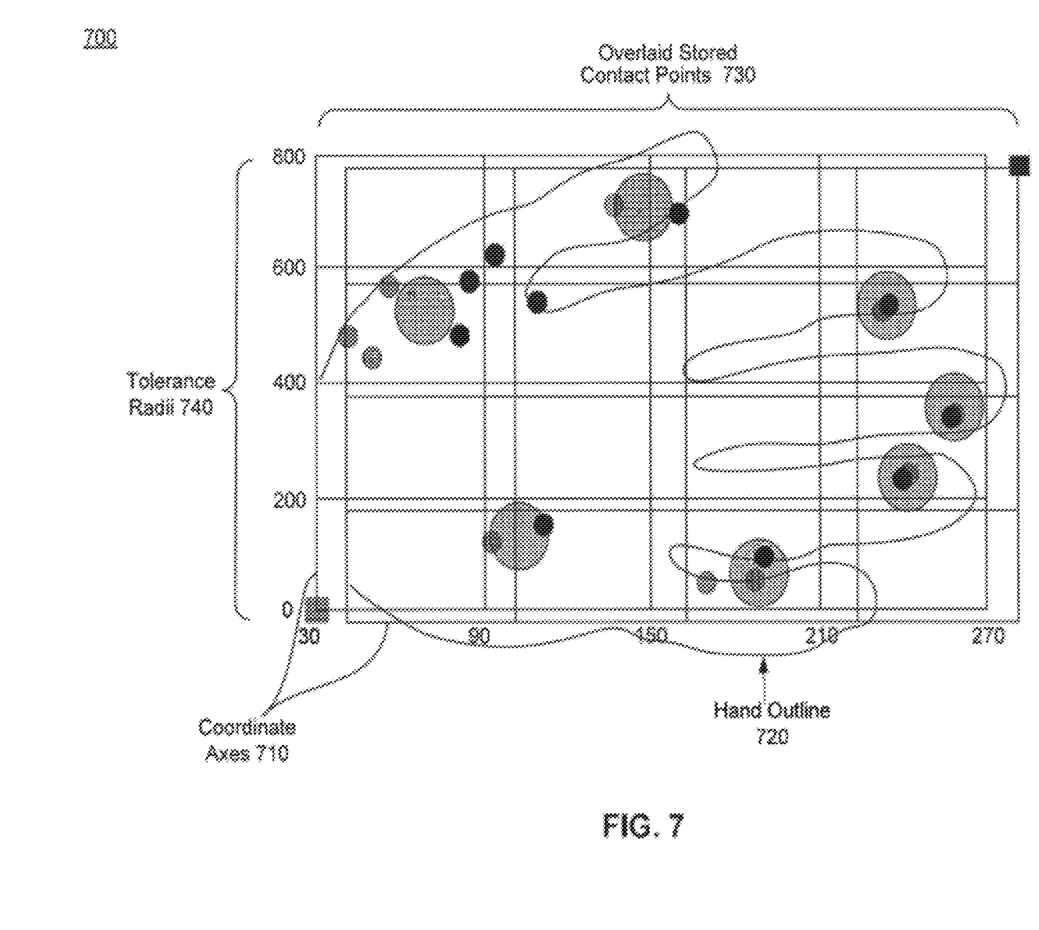
FIG. 7 is a diagram of overlaid stored contact points in conjunction with tolerance radii associated with user contact points from an unidentified hand.

FIG. 7 is a diagram of overlaid stored contact points in conjunction with tolerance radii associated with user contact points from an unidentified hand. FIG. 7 shows coordinate axes 710 and overlaid stored contact points 730. FIG. 7 also shows a hand outline 720 that results when the unidentified user places his or her hand on touchscreen 130. FIG. 7 also illustrates tolerance radii 740 as large gray circles centered at contact points made between the hand of the unidentified user and the touchscreen. These tolerance radii are used as a part of the matching process, as described below.

Figure 8:
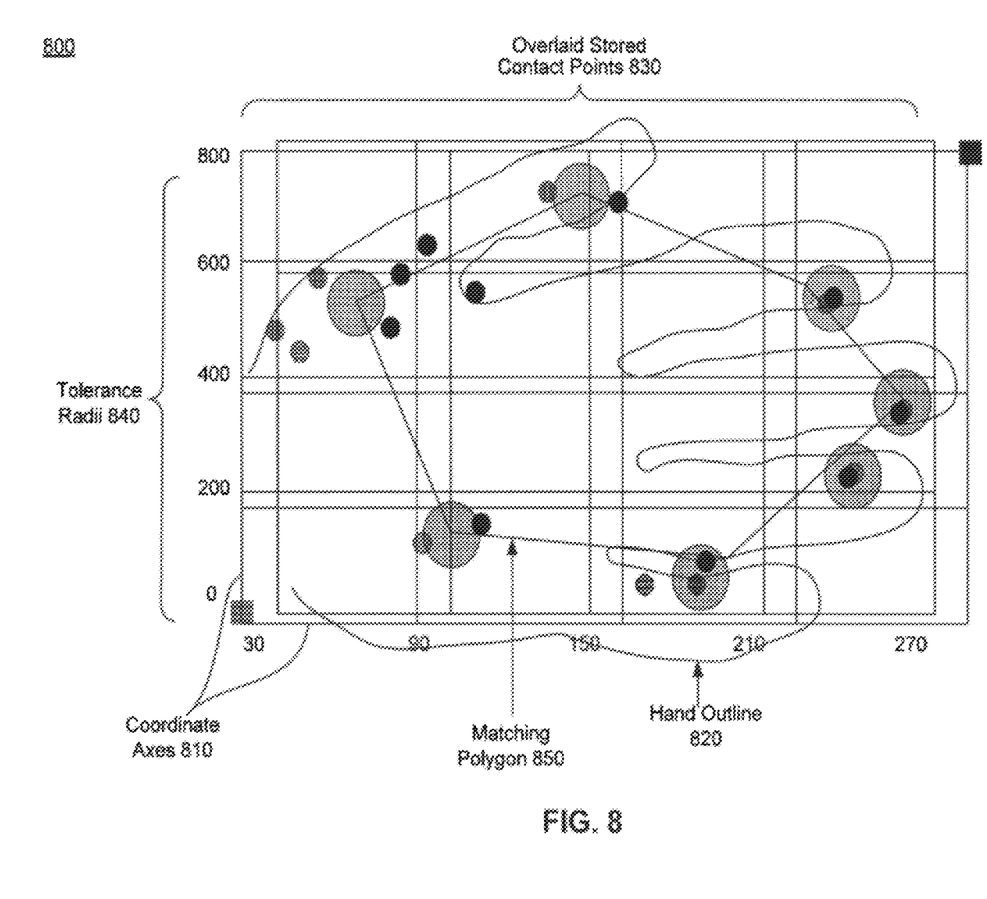
FIG. 8 is a diagram of overlaid stored contact points with tolerance radii of the unidentified user and a matching polygon.

FIG. 8 is a diagram of overlaid stored contact points with tolerance radii of the unidentified user and a matching polygon. FIG. 8 has coordinate axes 810, hand outline 820, and overlaid stored contact points 830 similar to FIG. 7. However, the points with tolerance radii 840 have been connected to form a polygon. The polygon is used as part of the matching process, as described below.

As can be seen from FIGS. 7 and 8, the tolerance radii define circular areas at predefined distances around the contact points from the unidentified user hand framework. Embodiments calculate distances between contact points from the unidentified user hand framework and the points that were stored previously in hand frameworks in the data repository. When the stored points in hand frameworks in the data repository are within tolerance radii of the unidentified user hand framework points, the specific distance is calculated using appropriate geometrical formulas. The average of all distances between points within the tolerance radii for user hand framework points and points from frameworks from the data repository points is then determined. This average may be the arithmetic mean, determined by summing the relevant distances and dividing by the number of distances. Such an average is representative of how close relevant points are to one another, and the lower the average, the better the match. However, in order to be considered for matching, a certain proportion of the tolerance radii must overlap contact points from a candidate set of contact points from data repository 170. The goal of these conditions is to verify that a certain number of contact points correspond between the unidentified user hand framework and the framework from data repository 170 and that they are sufficiently close, overall.

For example, in FIG. 7, six of the seven tolerance radii overlap with twelve of the contact points. The tolerance radius, in the example of FIG. 7, is approximately 50 distance units. The average distance between the user data points within the tolerance radii of data points in the hand framework is approximately 20-30 distance units, in the example of FIG. 7. It may be required of the corresponding hand framework that a certain proportion of tolerance radii overlap with the hand framework. For example, two-thirds of the tolerance radii may be required to overlap.

The distances between the unidentified user hand framework points and the candidates from data repository 170 with sufficient overlap are calculated, and the lowest average distance is assigned as the corresponding framework. However, the lowest average distance must be less than a predetermined threshold.

For example, there might be frameworks from the data repository, compared to the user hand framework, with averages of 35 distance units (with four of seven overlapping), 40 distance units (with five of seven overlapping), and 50 distance units (with six of seven overlapping), with a proportion threshold of two-thirds. In this case, if the maximum allowable average distance was 45 units, the framework with an average of 40 distance units would be selected as matching the unidentified user because it has the lowest average distance with at least two-thirds tolerance radii that overlap points. However, if the maximum allowable average distance was 36 distance units, there would be no match, given this selection, as there is no framework which is sufficiently close with a sufficient proportion of corresponding framework points.

Additional Features

In an embodiment, the user is allowed to identify himself or herself as a new user when there is no corresponding hand framework.

In certain embodiments, the plurality of user contact points for user hand frameworks or stored contact points frameworks in the data repository include at least 10 contact points to improve accuracy. Furthermore, each finger of the hand of the user may define at least one contact point. However, various embodiments may function with smaller or larger data sets.

In an embodiment, the tolerance radius size and the preset maximum are proportional to the area covered by a polygon defined by the user hand framework.

It is also to be noted that hand frameworks are to be considered equivalent despite translation or rotation. Thus, embodiments may include the additional step of, before comparing the user hand framework to the hand frameworks from the data repository, transforming the user hand framework, by translating and rotating, to maximize overlapping area minus non-overlapping area between a polygon defined by the user hand framework and polygons defined by the hand frameworks from the data repository.

Thus, embodiments incorporate a variety of features in new and advantageous ways. By storing data about hand frameworks in a data repository and allowing matching between the hand framework of a user and hand frameworks in an easy, reliable way, embodiments allow for a simple, secure way to identify users at touchscreens. Such a facilitated login when using a touchscreen is helpful for the many computing devices where a password is inconvenient and drawing a pattern is insecure.

Thus, embodiments represent a significantly improved means of allowing access and login for a touchscreen enabled computing device.

The Summary and Abstract sections may set forth one or more but not all exemplary embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for identifying a user on a computing device using biometric hand data, the method comprising:
    receiving an indication that a hand of the user has been placed on a touchscreen of the computing device;
    determining locations of a plurality of user contact points made between the hand of the user and the touchscreen, wherein the plurality of user contact points define a user hand framework;
    matching the user hand framework with a corresponding stored hand framework, defined by a plurality of stored contact points, from a data repository, wherein the matching comprises:
        comparing the user hand framework to one or more stored hand frameworks in the data repository by calculating distances between the plurality of user contact points in the user hand framework and respective stored contact points in the stored hand frameworks from the data repository;
        determining which of the stored contact points of the stored hand frameworks are within a predetermined tolerance radius of the user contact points in the user hand framework;
        identifying one or more stored hand frameworks with at least a preset minimum number of stored contact points that are within the tolerance radii of the user contact points in the user hand framework;
        selecting a stored hand framework from the identified stored hand frameworks, wherein the selecting comprises:
            determining, for each identified stored hand framework, one or more stored contact points that are within the tolerance radii of the user contact points;
            measuring a distance between each of the determined stored contact points and the center of a corresponding tolerance radius;
            calculating an average of the measured distances for each hand framework; and
            selecting a stored hand framework with a lowest average calculated distance;
        determining that the selected stored hand framework is the corresponding hand framework when the average of the distances between user contact points and respective stored contact points is less than a preset maximum; and identifying the user based on the corresponding hand framework.

2. The method of claim 1, wherein the hand of the user is placed palm-up, palm-down, or both one at a time, and wherein the matching incorporates using the palm-up, palm-down, or both types of data to facilitate identifying the corresponding hand framework.

3. The method of claim 1, wherein the user is allowed to identify himself or herself as a new user when there is no corresponding hand framework.

4. The method of claim 1, wherein the plurality of user contact points and the plurality of stored contact points comprise a plurality of Cartesian coordinate pairs in an absolute Cartesian coordinate system.

5. The method of claim 1, wherein the plurality of user contact points and the plurality of stored contact points comprise a plurality of Cartesian coordinate pairs in a relative Cartesian coordinate system.

6. The method of claim 1, wherein the plurality of user contact points comprises at least 10 contact points.

7. The method of claim 1, wherein each finger of the hand of the user defines at least one contact point.

8. The method of claim 1, wherein the tolerance radius is proportional to the area covered by a polygon defined by the user hand framework.

9. The method of claim 1, wherein the preset maximum is proportional to the area covered by a polygon defined by the user hand framework.

10. The method of claim 1, further comprising, before comparing the user hand framework to the hand frameworks from the data repository, transforming the user hand framework, by translating and rotating, to maximize overlapping area minus non-overlapping area between a polygon defined by the user hand framework and polygons defined by the hand frameworks from the data repository.

11. The method of claim 1, wherein the preset minimum number of stored contact points comprises a preset proportion of stored contact points.

12. A system for identifying a user on a computing device using biometric hand data, the method comprising:
    a computing device;
    coupled to the computing device, a touchscreen upon which the user places a hand, the touchscreen configured to determine the locations of a plurality of user contact points between the hand of the user and the touchscreen that define a user hand framework;
    a data repository configured to store hand frameworks;
    a hand framework manager, coupled to the data repository, configured to match the user hand framework to a corresponding stored hand framework from the data repository by:
        comparing the user hand framework to one or more stored hand frameworks in the data repository by calculating distances between the plurality of user contact points in the user hand framework and the respective stored contact points in the stored hand frameworks from the data repository;
        determining which of the stored contact points of the stored hand frameworks are within a predetermined tolerance radius of the user contact points in the user hand framework;
        identifying a-one or more stored hand frameworks with at least a preset minimum number of stored contact points that are within the tolerance radii of the user contact points in the user hand framework;
        selecting a stored hand framework from the identified stored hand frameworks, wherein the selecting comprises:
            determining, for each identified stored hand framework, one or more stored contact points that are within the tolerance radii of the user contact points;
            measuring a distance between each of the determined stored contact points and the center of a corresponding tolerance radius;
            calculating an average of the measured distances for each hand framework; and
            selecting a stored hand framework with a lowest average calculated distance;
        determining that the selected hand framework is the corresponding hand framework when the average of the distances between user contact points and respective stored contact points is less than a preset maximum; and
    a user identifier configured to identify the user based on the corresponding hand framework.

13. The system of claim 12, wherein the hand of the user is placed palm-up, palm-down, or both one at a time, wherein the hand framework manager uses the palm-up, palm-down, or both types of data to facilitate identifying the corresponding hand framework.

14. The system of claim 12, wherein the user is allowed to identify himself or herself as a new user when there is no corresponding hand framework.

15. The system of claim 12, wherein the plurality of user contact points and the plurality of stored contact points comprise a plurality of Cartesian coordinate pairs in an absolute Cartesian coordinate system.

16. The system of claim 12, wherein the plurality of user contact points and the plurality of stored contact points comprise a plurality of Cartesian coordinate pairs in a relative Cartesian coordinate system.

17. The system of claim 12, wherein the plurality of user contact points comprises at least 10 contact points.

18. The system of claim 12, wherein each finger of the hand of the user defines at least one contact point.

19. The system of claim 12, wherein the tolerance radius is proportional to the area covered by a polygon defined by the user hand framework.

20. The system of claim 12, wherein the preset maximum is proportional to the area covered by a polygon defined by the user hand framework.

21. The system of claim 12, wherein the hand framework manager is further configured to, before comparing the user hand framework to the stored hand frameworks in the data repository, transform the user hand framework, by translating and rotating, to maximize overlapping area minus non-overlapping area between a polygon defined by the user hand framework and polygons defined by the stored hand frameworks in the data repository.

22. A computer-readable non-transitory storage medium having computer-executable instructions stored thereon that, when executed by a processor, cause the processor to identify a user on a computing device using biometric hand data by executing steps comprising:
    receiving an indication that a hand of the user has been placed on a touchscreen of the computing device;
    determining locations of a plurality of user contact points made between the hand of the user and the touchscreen, wherein the plurality of user contact points define a user hand framework;

matching the user hand framework with a corresponding stored hand framework, defined by a plurality of stored contact points, from a data repository, wherein the matching comprises:
   comparing the user hand framework to one or more stored hand frameworks in the data repository by calculating distances between the plurality of user contact points in the user hand framework and respective stored contact points in the stored hand frameworks from the data repository;
   determining which of the stored contact points of the stored hand frameworks are within a predetermined tolerance radius of the user contact points in the user hand framework;
   identifying one or more stored hand frameworks with at least a preset minimum number of stored contact points that are within the tolerance radii of the user contact points in the user hand framework;
   selecting a stored hand framework from the identified stored hand frameworks, wherein the selecting comprises:
     determining, for each identified stored hand framework, one or more stored contact points that are within the tolerance radii of the user contact points;
     measuring a distance between each of the determined stored contact points and the center of a corresponding tolerance radius;
     calculating an average of the measured distances for each hand framework; and
     selecting a stored hand framework with a lowest average calculated distance;
   determining that the selected stored hand framework is the corresponding hand framework when the average of the distances between user contact points and respective stored contact points is less than a preset maximum; and
identifying the user based on the corresponding hand framework.

\* \* \* \* \*